(12) United States Patent
Shin et al.

(10) Patent No.: US 9,606,752 B2
(45) Date of Patent: Mar. 28, 2017

(54) ASSOCIATING PRINT SETTINGS TO INDIVIDUAL PRINT OBJECTS IN A PRINT PREVIEW

(71) Applicant: Samsung Electronics Co., Ltd, Suwon-si, Gyeonggi-do (KR)

(72) Inventors: Woo-chul Shin, Osan-si (KR); Jun-young Choi, Suwon-si (KR); Seung-wan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/933,767

(22) Filed: Jul. 2, 2013

(65) Prior Publication Data
US 2014/0126013 A1  May 8, 2014

(30) Foreign Application Priority Data
Nov. 8, 2012 (KR) .......... 10-2012-0126109

(51) Int. Cl.
*G06F 3/12* (2006.01)

(52) U.S. Cl.
CPC .......... *G06F 3/1204* (2013.01); *G06F 3/1219* (2013.01); *G06F 3/1244* (2013.01); *G06F 3/1256* (2013.01); *G06F 3/1285* (2013.01)

(58) Field of Classification Search
CPC ..... G06F 3/1256; G06F 3/1204; G06F 3/1219
USPC .............. 358/1.1, 1.2, 1.15; 715/274
See application file for complete search history.

(56) References Cited

U.S. PATENT DOCUMENTS

| | | | |
|---|---|---|---|
| 6,798,530 B1 * | 9/2004 | Buckley | G06F 3/1204 358/1.1 |
| 2003/0218764 A1 * | 11/2003 | Ooyama | 358/1.9 |
| 2004/0119763 A1 * | 6/2004 | Mizobuchi et al. | 345/863 |
| 2006/0203277 A1 * | 9/2006 | Suzuki | 358/1.14 |
| 2007/0024920 A1 | 2/2007 | Kishi et al. | |
| 2008/0094669 A1 | 4/2008 | Imai | |
| 2011/0141493 A1 * | 6/2011 | Berger et al. | 358/1.6 |
| 2011/0157614 A1 * | 6/2011 | Ueda | G03G 15/04027 358/1.9 |

FOREIGN PATENT DOCUMENTS

| | | |
|---|---|---|
| JP | 2005-086771 | 3/2005 |
| JP | 2008-060677 | 3/2008 |
| JP | 2013-228973 | * 11/2013 |
| KR | 2005-0122306 | 12/2005 |
| KR | 2012-0062291 | 6/2012 |

OTHER PUBLICATIONS

English language machine translation of JP 2013-228973 to Kitamura.*

* cited by examiner

*Primary Examiner* — Eric A Rust
(74) *Attorney, Agent, or Firm* — Staas & Halsey LLP

(57) ABSTRACT

A printing control apparatus includes a display unit to display a preview screen of a document to print, a control unit to extract objects included in the document displayed on the preview screen and individually set a printing option corresponding to an object selected by a user from among the extracted objects, and a printing data generation unit to generate printing data corresponding to the set printing option and to spool the printing data.

5 Claims, 20 Drawing Sheets

ASSOCIATING PRINT SETTINGS TO INDIVIDUAL PRINT OBJECTS IN A PRINT PREVIEW

CROSS-REFERENCE TO RELATED APPLICATIONS

This application claims priority under 35 U.S.C. §119(a) from Korean Patent Application No. 10-2012-0126109, filed on Nov. 8, 2012, in the Korean Intellectual Property Office, the disclosure of which is incorporated herein by reference in its entirety.

BACKGROUND

1. Field

Apparatuses and methods consistent with the present general inventive concept relate to a printing control apparatus and method, and more particularly, to a printing control apparatus and method of providing an enhanced preview.

2. Description of the Related Art

A preview function to check a printing state in advance before printing is provided by an application or driver of a printing control apparatus. The preview function provided by a driver may provide a function to select diverse printing options on a preview screen and applying the selected printing options to a document to print as well as the preview. The preview function or the editing functions in the preview may include diverse ecologically-friendly (eco) functions to save toner and paper, such as black-and-white setting, processing of text and images, double-sided printing, layout setting, etc. Such functions may be applied to every page in the document, or only to specific selected pages. However, it was not originally possible to apply such functions to a specific portion of a specific page, or to apply such functions to the remaining portion except for such a portion.

However, a method of changing printing options for a specific portion of a specific page has been known to one of ordinary skill in the related art. More specifically, in the related art, printing data is generated by individually designating a specific object on a preview page and applying a toner saving effect to the designated object. However, the related art requires the user to individually designate each object on a page including a plurality of objects, thereby resulting in user inconvenience, and it is extremely difficult to select a specific object exactly as desired to change a printing option corresponding to the specific object.

SUMMARY

The present general inventive concept is directed to a printing apparatus to allow a user to select objects on a preview screen of a document order to selectively change printing options to the selected objects, and a method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a printing control apparatus which allows the user to simply and conveniently manipulate printing options for objects in a preview state of printing, and a printing control method thereof.

The foregoing and/or other features and utilities of the present general inventive concept may also be achieved by providing a printing control apparatus including a display unit to display a preview screen of a document to print, a control unit to extract objects included in the document displayed on the preview screen and individually set a printing option corresponding to an object selected by a user from among the extracted objects, and a printing data generation unit to generate printing data in which a printing option for an object is set and to spool the printing data.

The control unit may sense the user's manipulation input through the display unit, determine whether the extracted objects are included in a selection area selected by the user's manipulation, and apply the printing option only to an object that is included in the selection area.

If a portion of the object is included in the selection area, the control unit may determine whether the object having the included portion is included in the selection area in accordance with a preset condition.

The control unit may control the display unit to display a user interface (UI) screen to set the preset condition.

The preset condition may be one of a condition of allowing the object having the included portion to be included in the selection area, a condition of not allowing the object having the included portion to be included in the selection area, and a condition of allowing the object having the included portion to be included in the selection area when the included portion is more than a predetermined rate.

The control unit may apply the printing option at once according to a type of the objects included in the selection area.

The control unit may control the display unit to display a UI screen to select the object type.

The object type may be an image, text and a vector.

The foregoing and/or other features and utilities of the present general inventive concept may also be achieved by providing a printing control method of a printing control apparatus including displaying a preview screen of a document to print, extracting objects included in the document displayed on the preview screen, determining which object is included in a selection area selected by a user from among the extracted objects, individually setting a printing option corresponding to an object included in the selection area, and generating printing data in which the printing option corresponding to the object is set and spooling the printing data.

The determining operation may include sensing the user's manipulation, and determining whether the extracted objects are included in the selection area selected by the user's manipulation, in the setting operation, the printing option may be applied only to an object which is included in the selection area.

In the setting operation, if a portion of the object is included in the selection area, it may be determined whether the object having the included portion is included in the selection area in accordance with a preset condition.

The printing control method may further include displaying a user interface (UI) screen to set the preset condition.

The preset condition may be one of a condition of allowing the object having the included portion to be included in the selection area, a condition of not allowing the object having the included portion to be included in the selection area, and a condition of allowing the object having the included portion to be included in the selection area when the included portion is more than a predetermined rate.

In the setting operation, the printing option may be applied at once according to a type of the objects included in the selection area.

The printing control method may further include displaying a UI screen to select the object type.

The object type may be an image, text and a vector.

The foregoing and/or other features and utilities of the present general inventive concept may also be achieved by providing a computer-readable recording medium having embodied thereon a computer program to execute a printing control apparatus is provided, the printing control method including displaying a preview screen of a document to print, extracting objects included in the document displayed on the preview screen, determining which object is included in a selection area selected by a user from among the extracted objects, individually setting a printing option corresponding to an object included in the selection area, and generating printing data in which the printing option corresponding to the object is set and spooling the printing data.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
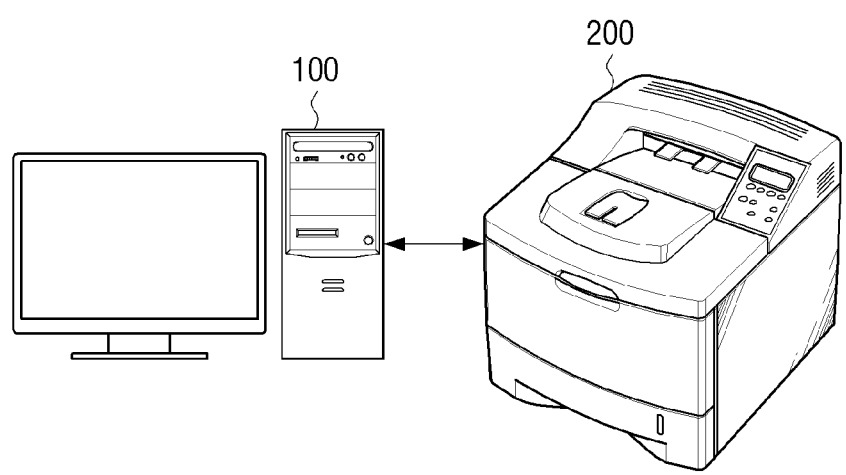
FIG. 1 is a block diagram illustrating a structure of connecting an image forming apparatus to a printing control apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a structure of connecting an image forming apparatus 200 to a printing control apparatus 100 according to an exemplary embodiment of the present general inventive concept.

With reference to FIG. 1, the printing control apparatus 100 according to an exemplary embodiment of the present general inventive concept is connected to an image forming apparatus 200. The printing control apparatus 100 generates printing data and spools the printing data to the image forming apparatus 200, so that a printing operation is performed.

The printing control apparatus 100 according to an exemplary embodiment of the present general inventive concept has a preview function that allows a user to view a document prior to performing the printing operation. A preview is a screen to check a the document in advance before performing the printing operation, using a display unit 110 of the printing control apparatus. The preview screen includes at least one object. An object may be text, images, tables, figures, charts, graphs, etc., but is not limited thereto, which constitute a document to be printed.

If a user manipulation is input on the preview screen, the printing control apparatus 100 extracts objects included in a selected area. If the user inputs a printing option corresponding to the extracted objects, the printing control apparatus 100 updates and displays the preview screen by changing the extracted objects in accordance with the input printing option at a same time. In addition, the printing control apparatus 100 may generate printing data of which a printing option is set to correspond to each object and transmit the printing data to the image forming apparatus 200.

The image forming apparatus 200 performs a printing operation based on the printing data of which a printing option is set to correspond to each object. For example, from among objects, printing options corresponding to a picture and text, respectively, may be set differently. As such, since the printing option corresponding to a picture may be set separately, an amount of toner used to print the picture may be saved. Accordingly, the image forming apparatus 200 according to an exemplary embodiment of the present general inventive concept may save the use of toner and paper.

A configuration of the printing control apparatus 100 is described here in detail.

Figure 2:
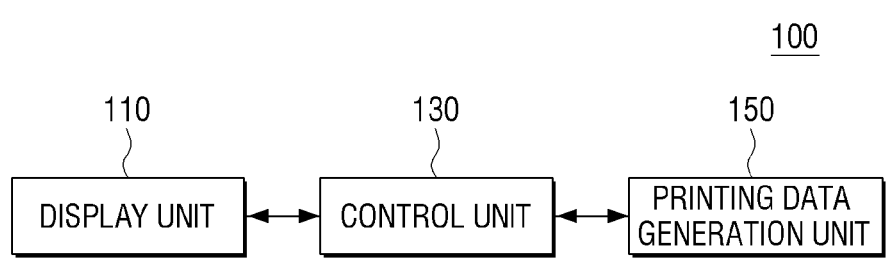
FIG. 2 is a block diagram illustrating a configuration of a printing control apparatus according to an exemplary embodiment of the present general inventive concept.

FIG. 2 is a block diagram illustrating a configuration of the printing control apparatus 100 according to an exemplary embodiment of the present general inventive concept.

With reference to FIG. 2, the printing control apparatus 100 may include a display unit 110, a control unit 130, and a printing data generation unit 150.

The display unit 110 receives a preview file from the control unit 130 and displays a preview screen. The display unit 110 may include a touch panel and sense a touch input of the user through the touch panel. Accordingly, if a manipulation selected by the user is performed on the preview screen displayed on the display unit 110, the printing control apparatus 100 may sense the user's manipulation.

The control unit 130 generates preview user interface (UI) data and transmits the generated data to the display unit 110. If the user selects a portion or all of the preview screen displayed on the display unit 110, the control unit 130 extracts objects included in the selected area. The control unit 130 changes a printing option and eco option for the extracted objects individually and thus generates preview data.

The printing data generation unit 150 receives the preview data of which a printing option and an ecologically-friendly (eco) option have changed, and generates printing data to spool the received preview data to the image forming apparatus 200.

Figure 3:
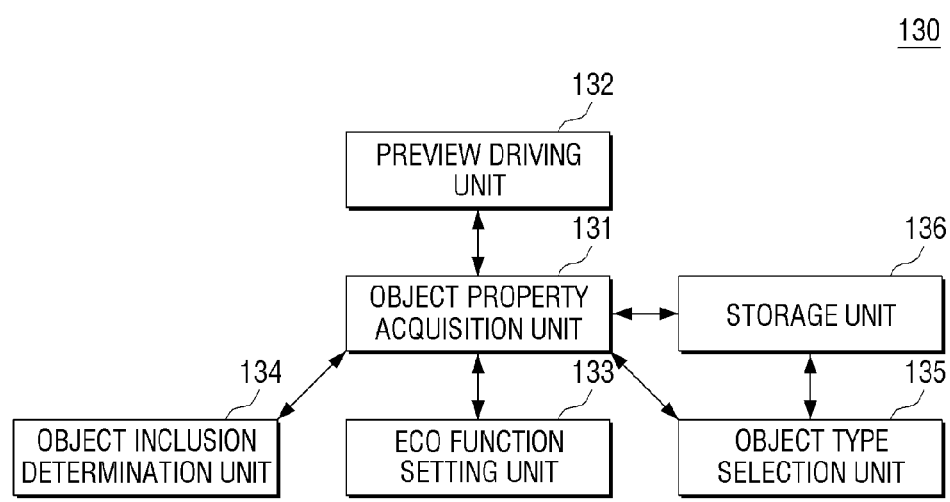
FIG. 3 is a block diagram illustrating a detailed configuration of a control unit of a printing control apparatus according to an exemplary embodiment of the present general inventive concept.

FIG. 3 is a block diagram illustrating a detailed configuration of the control unit 130 of the printing control apparatus 100 according to an exemplary embodiment of the present general inventive concept.

With reference to FIG. 3, the control unit 130 may include an object property acquisition unit 131, a preview driving unit 132, an eco function setting unit 133, an object inclusion determination unit 134, an object type selection unit 135, and a storage unit 136.

The object property acquisition unit 131 receives information about a document to print from a document editing application driven in the printing control apparatus 100, and acquires property information about an object such as images, text, and vectors included in the document based on the received information.

The preview driving unit 132 generates preview user interface (UI) data by applying a driver setting option to the object property information received from the object property acquisition unit 131, and transmits the generated preview UI data to the display unit 110.

The eco function setting unit 133 changes the object property information in accordance with an eco option setting regarding an object that the user selects on the preview screen, and transmits the changed object property information to the preview driving unit 132.

The object inclusion determination unit 134 determines whether objects are included in an area selected by the user based on the object property information acquired by the object property acquisition unit 131 and information about positions of the objects.

The object type selection unit 135 is a UI which enables the user to input an object type to apply a print setting or an eco setting from among the objects included in the area selected by the user.

The storage unit 136 stores the preview UI data. The storage unit 136 stores the preview UI data in an enhanced metafile format (EMF) format or EMF spool format. In addition, the storage unit 136 may store the printing data of the document to print that is received from the document editing application.

Figure 4:
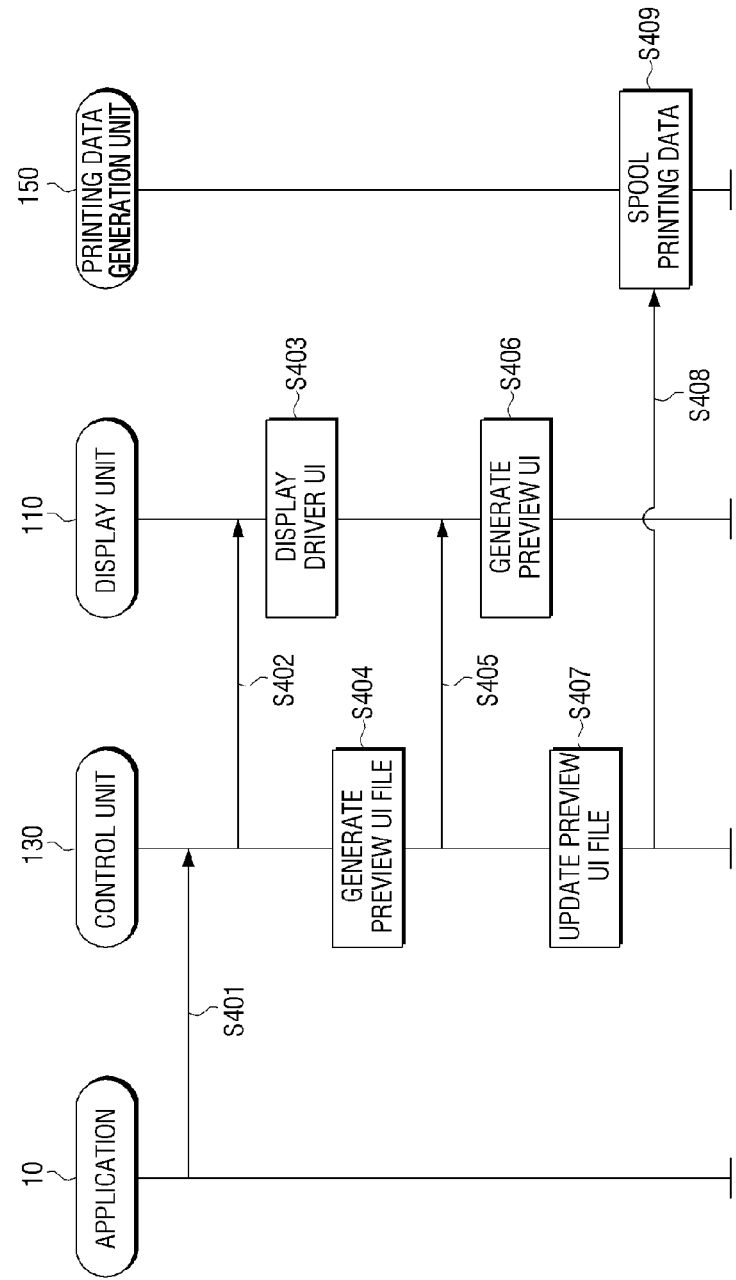
FIG. 4 illustrates a process of generating a preview using a printing control apparatus according to an exemplary embodiment of the present general inventive concept.

FIG. 4 illustrates a process of generating a preview using the printing control apparatus 100 according to an exemplary embodiment of the present general inventive concept.

With reference to FIG. 4, a process of generating a preview is described.

Firstly, the user executes an application capable of generating or editing a document or an image. The application 10 may be one of diverse document editing programs that are driven by the printing control apparatus 100. Alternatively, the application 10 may be a program that provides a screen capture or a screen printing on a web browsing screen.

In operation S401, the application 10 transmits a message to request generation of a driver UI window to the control unit 130 through a graphics device interface (GDI). In operation S402, the control unit 130 transmits a control signal to generate the driver UI window to the display unit 110 in accordance with the message of the application 10.

In operation S403, the display unit 110 displays the driver UI window based on the received control signal and driver UI information.

In operation S404, the control unit 130 reads out printing document data stored in the storage unit 160 and generates a preview UI file in an EMF spool format. In operation S405, the control unit 130 transmits the generated preview UI file to the display unit 110.

In operation S406, the display unit 110 displays a preview UI based on the received preview UI file.

In operation S407, the control unit 130 generates preview printing data of which a printing option and an eco option corresponding to objects selected on the preview screen by the user have changed. In operation S408, the control unit 130 transmits the preview printing data to the printing data generation unit 150.

In operation S409, the printing data generation unit 150 generates printing data and spools the printing data to the image forming apparatus 200.

Figure 5:
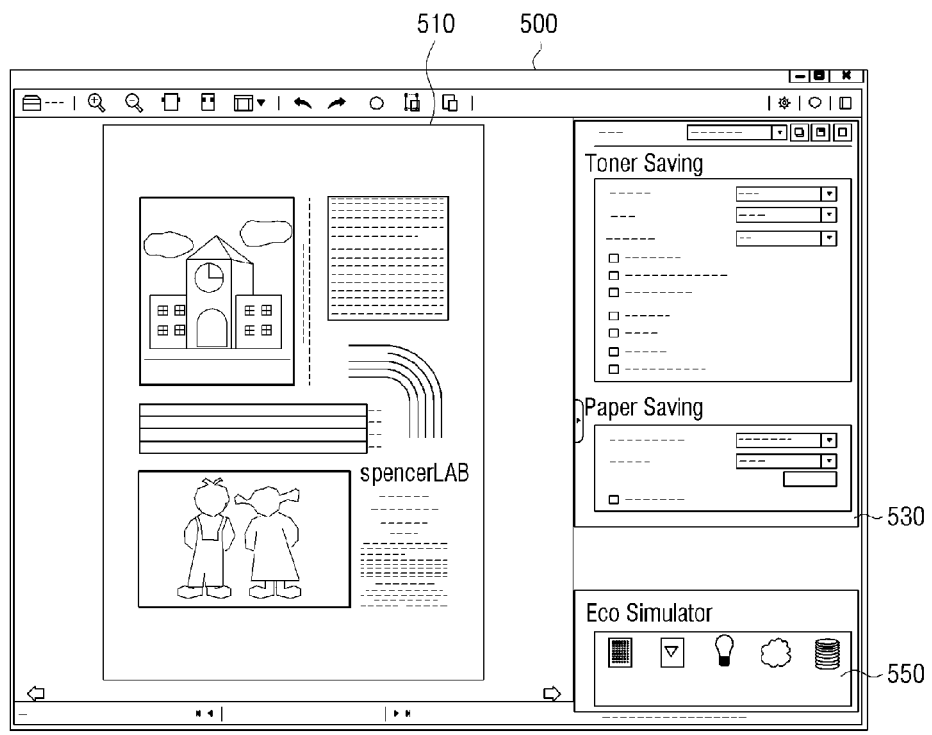
FIG. 5 is a display window illustrating an example of the preview generated in accordance with FIG. 4.

FIG. 5 is a display window illustrating an example of a preview generated in accordance with FIG. 4.

With reference to FIG. 5, a window screen 500 displays an example of a preview screen 510. The window screen 500 may include the preview screen 510, a printing option setting screen 530, and an eco simulator screen 550.

The preview screen 510 is a preview screen corresponding to a document to be printed. The document may include a plurality of objects. An object may include text, images, vectors, etc., but is not limited thereto. The preview screen 510 does not display an image file in a bitmap (BMP) format but displays a file in an EMF format or EMF spool format in order to allow a user to modify and change a plurality of objects individually. Accordingly, printing options corresponding to images, text, and vectors illustrated in the preview screen 510 of FIG. 5 may be set individually. In particular, if the user selects a portion of the preview screen 510, printing options corresponding to objects included in the selected portion may be changed, or printing options corresponding to remaining objects except for objects included in the selected portion may be changed. In addition, from among the objects included in the selected portion of the preview screen 510, the user may select an object type to apply an eco setting.

A screen to set printing options may be displayed along with the preview screen 510 on the window screen 500. The printing option setting screen 530 illustrated in FIG. 5 allows a user to select from a toner saving mode, a paper saving mode, a regular printing mode, a grayscale mode, and a high quality photo mode, for example, but is not limited thereto. If the eco setting mode is set, the eco simulator screen 550 is a screen to display simulation results with respect to energy saving, carbon dioxide emissions, solar power usage, etc., but is not limited thereto.

The printing control apparatus 100 may display the preview screen 510 and the printing option setting screen 530 together on the window screen 500. In the printing control apparatus 100, a user may choose to set printing options only for a preview screen 510 currently being displayed, or the user may choose to set printing options for an entire document or a portion of pages within the document if the document includes a plurality of pages.

A printing control method according to an exemplary embodiment of the present general inventive concept is described here in detail.

Figure 6:
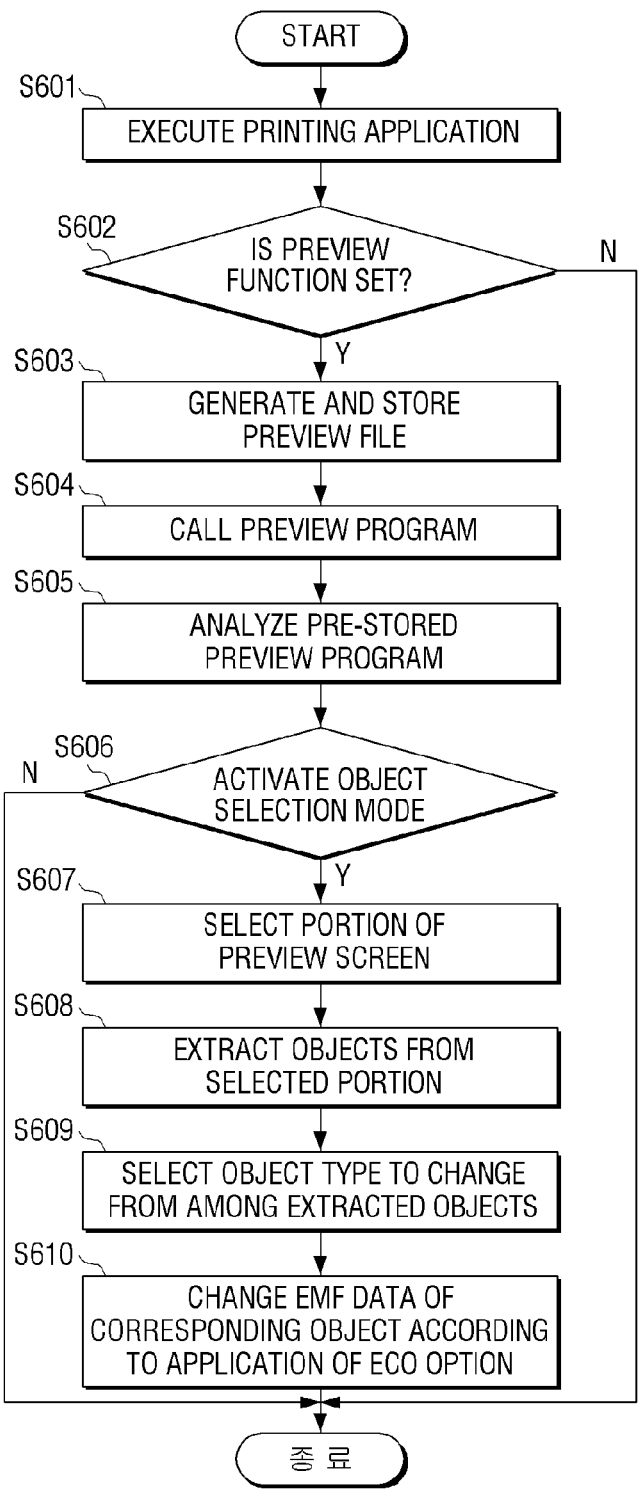
FIG. 6 is a flow chart illustrating a printing control method according to an exemplary embodiment of the present general inventive concept.

FIG. 6 is a flow chart illustrating a printing control method according to an exemplary embodiment of the present general inventive concept.

With reference to FIG. 6, assume that a document writing application to write or edit a document is being executed. Such a document writing application is merely an example. Diverse types of applications or programs may be used.

In operation S601, a printing application is executed. The user executes an application to create a new document or open and edit an existing document.

In operation S602, it is determined whether a preview function is set. If the preview function is set in operation S602-Y, a preview file is generated and stored in operation S603. If the preview function is not set in operation S602-N, printing data is generated in order to execute a printing job immediately.

If the preview function is activated, a preview program is called in operation S604. The preview program may be supported by the printing application or may be supported by an operating system of a personal computer (PC) if the printing control apparatus 100 is the PC.

If the preview program is called, a preset preview file is interpreted in order to display a window including a preview screen 510 in operation S605. That is, since the preset preview file is in an EMF format or EMF spool format, the preset preview file includes an identifier to identify an object. Accordingly, properties of the objects included in the preview file are analyzed based on the identifier of the object.

According to the printing control method of the present general inventive concept, printing options may be individually applied to each object displayed on the preview screen 510. In order to implement this feature, the printing control apparatus 100 must operate in an object selection activation mode.

The user may select the object selection activation mode manually, or the objects election activation mode may be selected automatically by an application.

In order to allow the user to manually select the object selection activation mode, an example of entering into the object selection activation mode is described with reference to FIG. 7.

Figure 7:
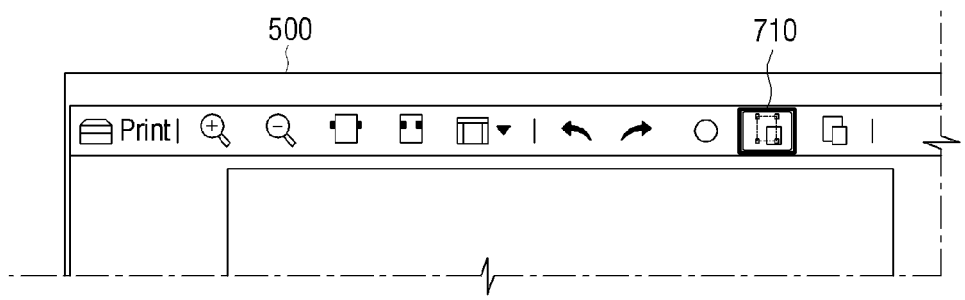
FIG. 7 illustrates a portion of the display window illustrated in FIG. 5 in order to describe a method of activating an object selection mode.

FIG. 7 illustrates a portion of the display window illustrated in FIG. 5 in order to describe a method of activating an object selection mode. When the preview screen 510 is displayed, the preview screen 510 may include a button to activate the object selection mode on a portion of the window screen 500.

As illustrated in FIG. 7, an object selection mode activation button 710 is provided on an upper portion of the window screen 500. If the user selects the activation button 710 of the window screen 500, the object selection mode is activated. If the user releases the activation button 710, the object selection mode is deactivated.

The activation button 710 may be included on the preview screen. It is also possible to activate the object selection mode by the user pressing a specific button of the printing control apparatus 100.

After analyzing the pre-stored preview file and displaying the preview screen, it is determined whether the object selection mode is activated in operation S606. If the object selection mode is activated in operation S606-Y, it is determined whether a portion of the preview screen is selected by the user's manipulation.

In operation S607, the user's manipulation to select a portion of the preview screen is input. The user may select a portion of the preview screen via a plurality of different methods. The plurality of different methods is described with reference to FIGS. 8 and 9.

Figure 8:
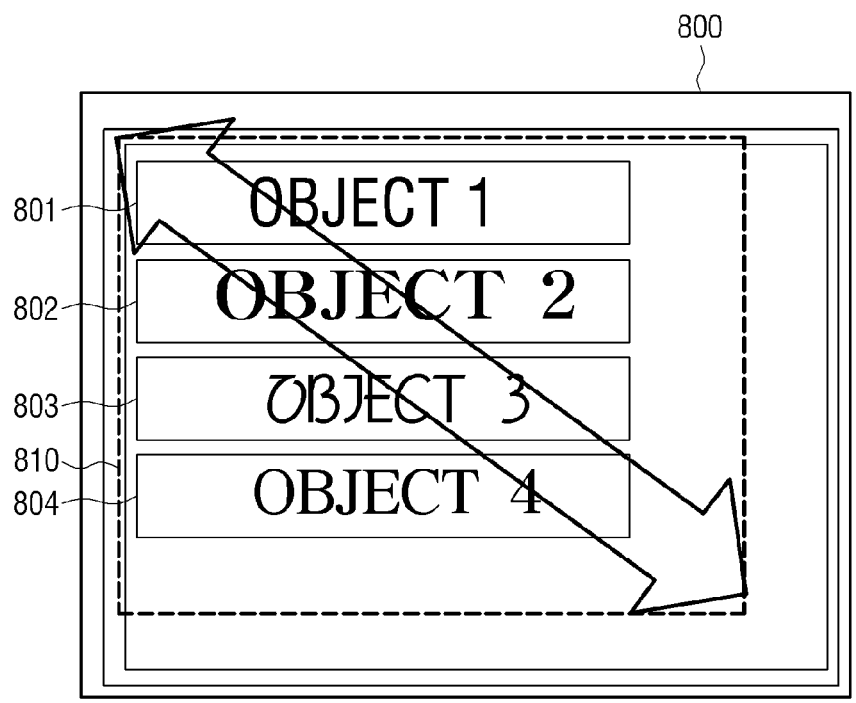
FIG. 8 illustrates an example of the user's manipulation to select objects on a preview screen according to an exemplary embodiment of the present general inventive concept.

FIG. 8 illustrates an example of the user's manipulation to select objects on a preview screen according to an exemplary embodiment of the present general inventive concept.

With reference to FIG. 8, the preview screen 800 includes four objects. A first object 801, a second object 802, a third object 803 and a fourth object 804 as illustrated in FIG. 8 include the words "OBJECT 1," "OBJECT 2," "OBJECT 3," and "OBJECT 4, " respectively, each displayed in different fonts. If the user drags the preview screen 800 and generates a rectangle 810, a portion of the preview screen 800 may be selected to include the first through fourth objects 801, 802, 803, and 804. Alternatively, the user may select a portion of the preview screen 800 by inputting coordinate values.

Figure 9:
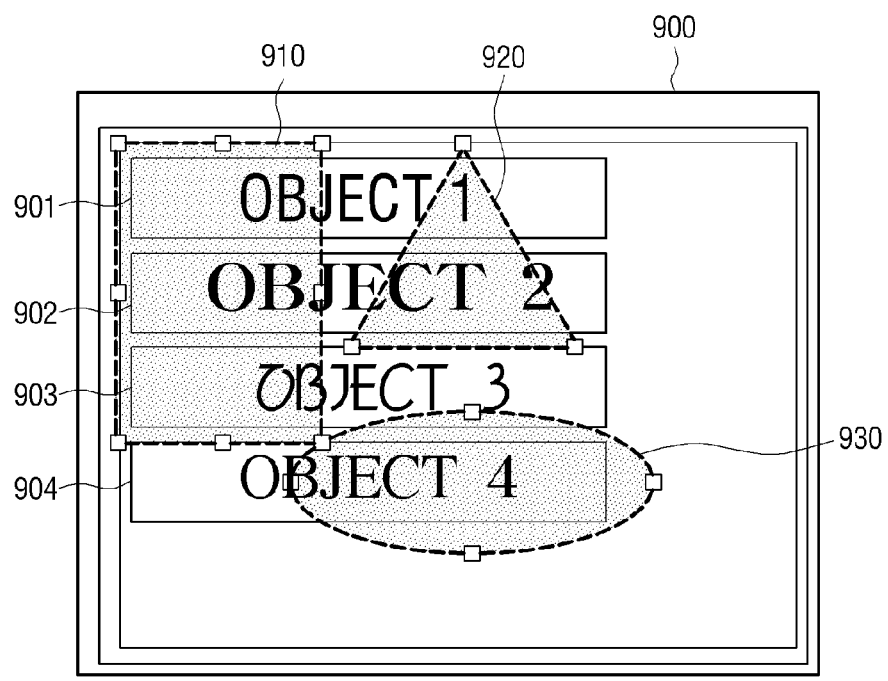
FIG. 9 illustrates another example of the user's manipulation to select objects on a preview screen according to an exemplary embodiment of the present general inventive concept.

A shape generated by dragging may be a rectangle or other figures. In FIG. 9, a plurality of different shapes of produced by dragging are illustrated.

FIG. 9 illustrates another example of the user's manipulation to select objects on a preview screen according to an exemplary embodiment of the present general inventive concept.

With reference to FIG. 9, the user may generate a rectangular shape 910, a triangular shape 920, an oval shape 930 or combination thereof using a finger, a pen or any other tools in order to select a portion of the preview screen 900.

As illustrated in FIG. 9, the rectangular shape 910 includes portions of the first to third objects 901 through 903, the triangular shape 920 includes portions of the first and second objects 901 and 902, and the oval shape 930 includes portions of the third and fourth objects 903 and 904.

If the user selects a portion of the preview screen 900 by dragging, the selected portion may include at least one object in whole or in part.

In operation S608, objects included in the portion selected by the user are extracted. That is, a portion of the preview screen 900 is selected by the user's manipulation and at least one object included in the selected portion is extracted. The object may be included in the selected portion in whole or in part. The object included in the selected portion in whole may be extracted as an object to change printing options. The method of extracting an object included in the selected portion is described in greater detail with reference to FIG. 10.

Figure 10:
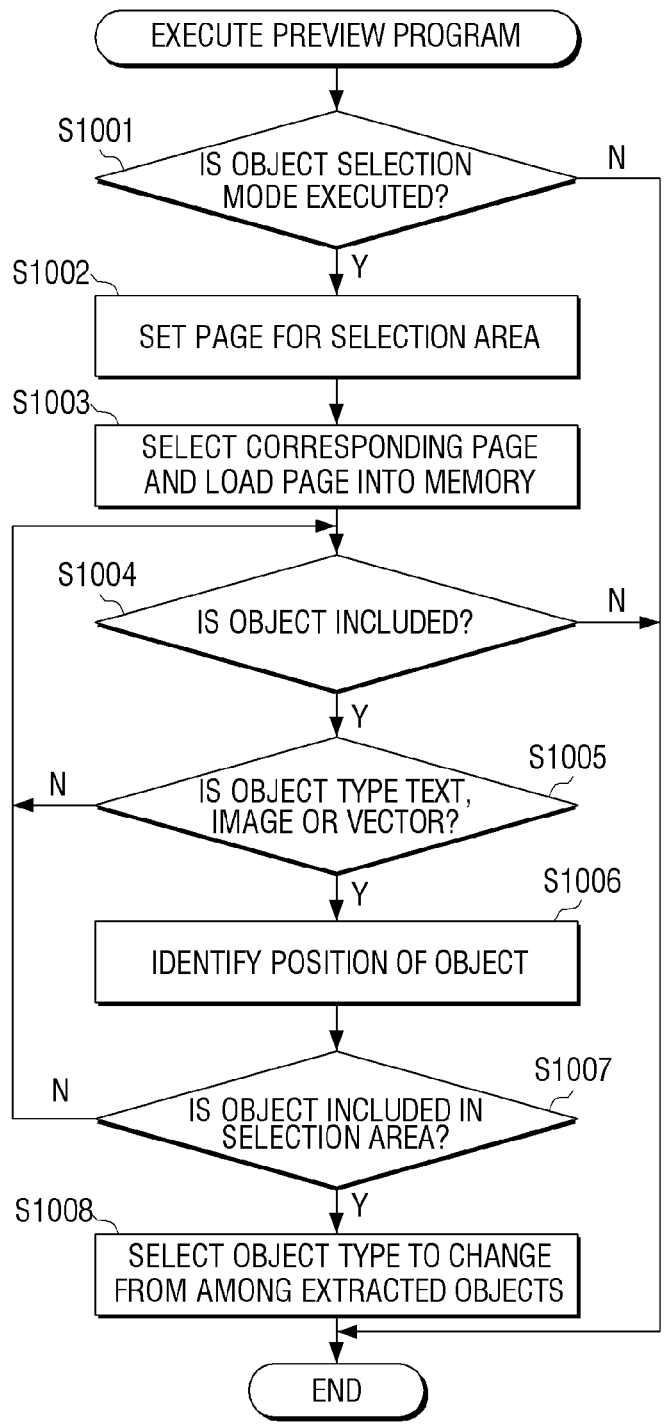
FIG. 10 is a flow chart illustrating a process of extracting an object in a printing control method according to another exemplary embodiment of the present general inventive concept.

FIG. 10 is a flow chart illustrating a process of extracting an object in a printing control method according to another exemplary embodiment of the present general inventive concept.

Before the process of extracting the object in the printing control method begins, a preview program is called and executed.

In operation S1001, it is determined whether an object selection mode is activated. If the object selection mode is activated in operation S1001-Y, page setting corresponding to a portion of a preview screen 900 selected by the user is performed in operation S1002. In operation S1003, a corresponding page is set to be printed and only a portion of the page including an object of an EMF format is loaded into a memory in order to enhance input and output and a filtering rate. In other words, before listing objects included in the selected portion and setting options corresponding to the selected portion, the selected portion of the page is loaded into the memory in order to enhance input and output and a filtering rate as a method of an EMF (Enhanced Metafile Format) data.

In operation S1004, it is determined whether the selected portion loaded into the memory includes an object. If the selected portion does not include an object, the printing control method ends since there is no object to change printing options.

If the selected portion includes an object in operation S1004-Y, it is determined whether the type of the object is text, image, or vector in operation S1005. That is, if the user pre-inputs the type of an object to change printing options through a user interface, it is automatically determined what the object type selected by the user is based on the user's input.

If it is determined that a type of object included in the selected portion is not one of text, image or vector, a query is made as to whether the object is include in a selection area as selected by the user. As such, since printing options corresponding to other objects that are not one of text, image or vector may not be changed, if it is determined that a type of object included in the selected portion is one of text, image or vector, positions of these objects are identified on the page in operation S1006. For example, on the preview screen 900, the portion selected by the user may include a plurality of texts, a plurality of images, and a plurality of vectors, and it is identified where each object is positioned on the page. The position of each object may be identified using pixel information of a corresponding object.

If the position of each object is identified on the page, it is determined whether the portion selected by the user includes the identified objects in operation S1007. That is, if a 100% of an object is included in the selected portion, it is determined that the object is included in the selected portion. If a portion of an object is included in the selected portion, it is determined whether it is determined that the object is included in the selected portion.

When a portion of an object is included in the selected portion, whether to include the object in the selected portion may be preset by the user. In addition, when more than specific rate (i.e., a percentage) of an object is included in the selected portion, it may be determined that the object is included in the selected portion. The specific rate may be preset by the user.

An object of which a portion is included in an area selected by the user may be extracted (i.e., included) as an object to change printing options, or may be excluded. That is, an object of which a portion is included in an area selected by the user may be extracted as an object based on the rate of the portion included in the selected area. As such, a user can preset a percentage of an object that is required to be selected, in order to include of exclude the object. Alternatively, an object of which a portion is included in an area selected by the user may not be unconditionally extracted as an object to change printing options. Thus, whether to extract an object of which a portion is included in the selected area may be determined according to an object selecting condition. The user may arbitrarily set the object selecting condition. A method of setting the object selecting condition is described in detail with reference to FIG. 11.

Figure 11:
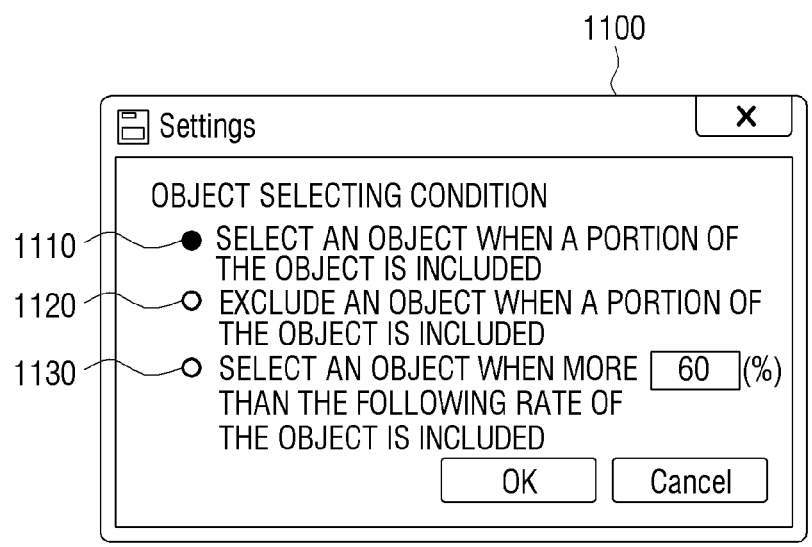
FIG. 11 illustrates an example of a window screen to input an object selecting condition in a printing control apparatus according to an exemplary embodiment of the present general inventive concept.

FIG. 11 illustrates an example of a window screen to input an object selecting condition in the printing control apparatus 100 according to an exemplary embodiment of the present general inventive concept.

With reference to FIG. 11, an object selecting condition may be input through an object selecting condition input window 1100. As illustrated in FIG. 11, the object selecting condition input window 1100 may include an item 1110 to select an object when a portion of the object is included, an item 1120 to exclude an object when a portion of the object is included, and an item 1130 to select an object when more than the following rate of the object is included.

If the item 1110 is set, an object having a portion included in an area selected by the user is extracted (i.e., included) as an object to change print settings.

If the item 1120 is set, an object having a portion included in an area selected by the user is excluded from an object to change print settings.

If the item 1130 is set and "the following rate" is set to 60%, an object of which more than 60% portion is included in an area selected by the user is extracted as an object to change print settings.

The extracted object may include one or more objects. If there are a plurality of extracted objects, each object may be of a different type. In the printing control method according to an exemplary embodiment of the present general inventive concept, the user may select an object type to change in operation S1008 when the user desires to change printing options corresponding to specific types of objects from among the plurality of extracted objects. A method of selecting an object type is described in detail with reference to FIG. 12.

Figure 12:
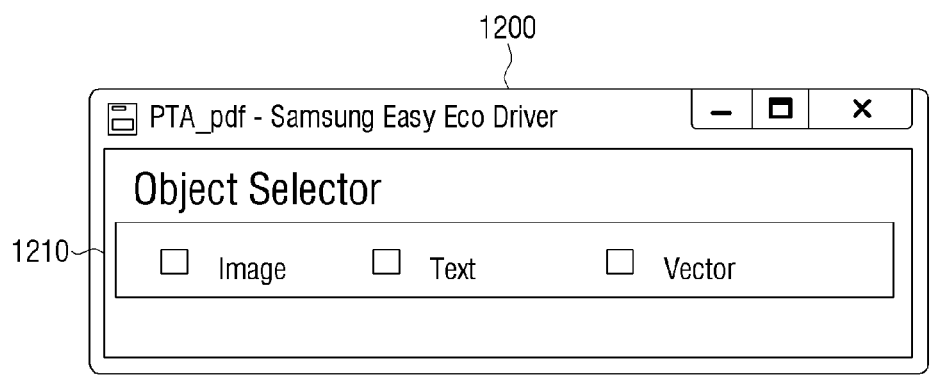
FIG. 12 illustrates an example of a method of inputting an object type in a printing control method according to another exemplary embodiment of the present general inventive concept.

FIG. 12 illustrates an example of a method for inputting an object type in a printing control method according to another exemplary embodiment of the present general inventive concept.

With reference to FIG. 12, an object selecting window 1200 to select an object type may be displayed in a UI window format so that the user may select at least one of image, text and vector.

If the user selects only text on the object selecting window 1200, printing options corresponding to the text-type objects may be changed.

For example, if the extracted objects are first text, second text, third text, a first image, and a second image, the user may change printing options only corresponding to the first text, second text, and third text objects. In the printing control method according to an exemplary embodiment of the present general inventive concept, a UI that enables the user to select an object type is provided. As stated above, if the user selects an item to select the object type through the UI, printing options only corresponding to the first through third texts may be changed, but printing options corresponding to the first and second images may not be changed.

That is, the user may select at least one of image, text, and vector in the object selection item 1210. If the user selects only text, a change of printing options corresponding to the text-type objects may be applied or released.

A substantial process of extracting a specific object on a preview screen and changing a printing option corresponding to the extracted object as described above is explained in more detail with reference to FIGS. 13 through 18.

Figure 13:
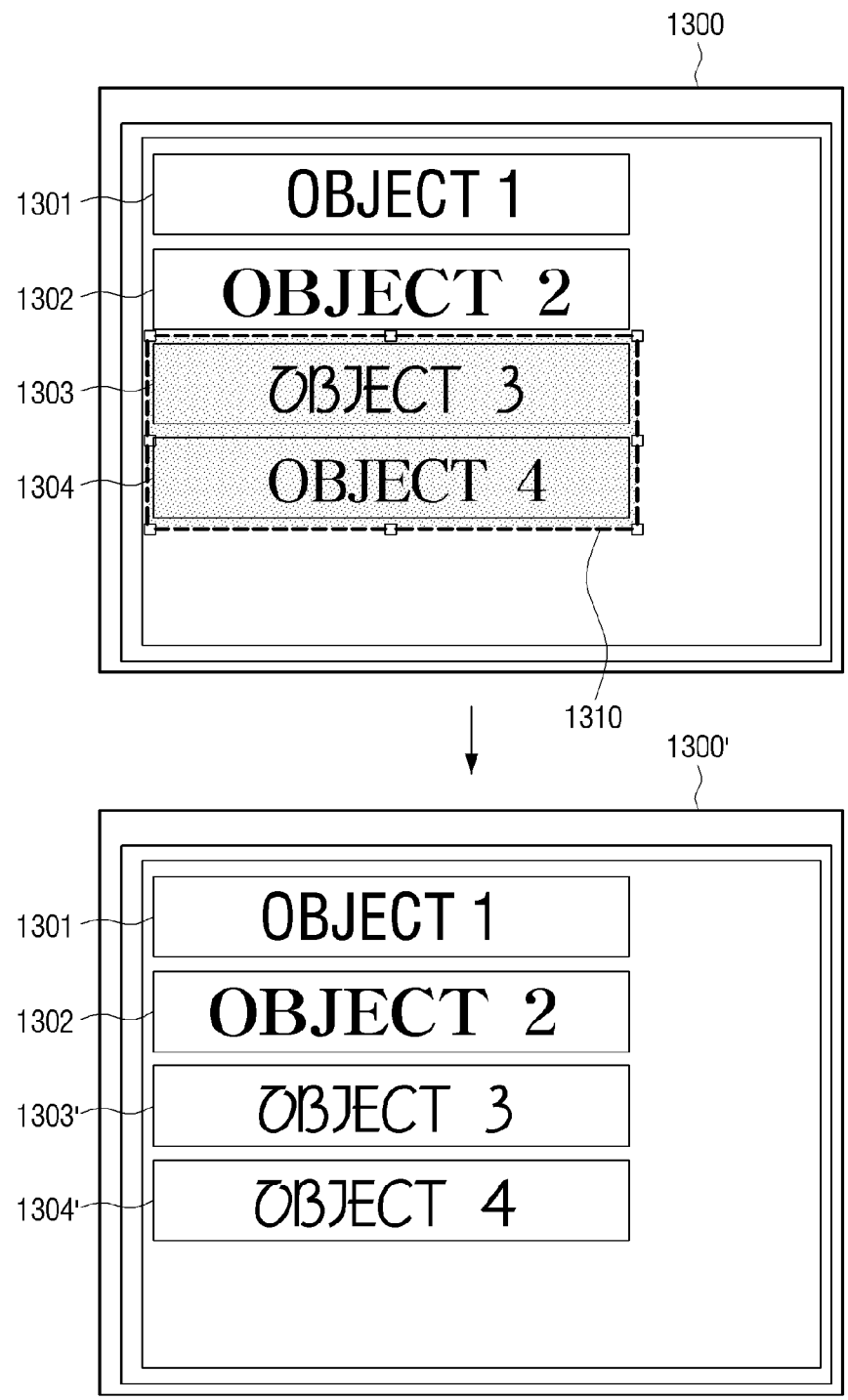
FIG. 13 illustrates a process of selecting objects and changing printing options on a preview screen according to an exemplary embodiment of the present general inventive concept.

FIG. 13 illustrates a process of selecting objects and changing printing options on a preview screen 1300 according to an exemplary embodiment of the present general inventive concept.

As illustrated in FIG. 13, the preview screen 1300 displays 4 objects 1301 through 1304. Assume that a type of the 4 objects 1301 through 1304 is text. The 4 objects 1301 through 1304 each have a different font type, a different letter type, and a different letter effect.

If the user selects the third object 1303 and the fourth object 1304, the third object 1303 and the fourth object 1304 are extracted to change their respective printing options. If the user's manipulation is performed to change the printing options corresponding to the extracted objects (not illustrated in FIG. 13), the printing options only corresponding to the extracted objects will be changed and displayed on the preview screen 1300.

The upper preview screen 1300 of FIG. 13 displays an example of selecting two of the four objects. It is illustrated that the user selects the third and fourth objects 1303 and 1304 using a selection area 1310, which is here depicted as a box having a dotted line. When an object is selected via the selection area 1310, the selected object may be expressed in a plurality of different ways. In the upper drawing of FIG. 13, the selected objects are expressed with a shaded box having a dotted line.

If the user selects the third and fourth objects 1303 and 1304 and changes printing options corresponding to the selected third and fourth objects 1303 and 1304 in a same manner, the printing options corresponding to the selected third and fourth objects are changed and displayed on the preview screen as third and fourth objects 1303' and 1304', as illustrated in the lower preview screen 1300' of FIG. 13).

In FIG. 13, the printing options changed by the user are font type and font size, as an example. Printing options may include other kinds of properties. For example, printing options such as size, color, resolution, font, shading, etc., may be changed according to the object type. Such printing options are merely examples, and a plurality of different types of printing options provided by a document editing application may be changed.

Figure 14:
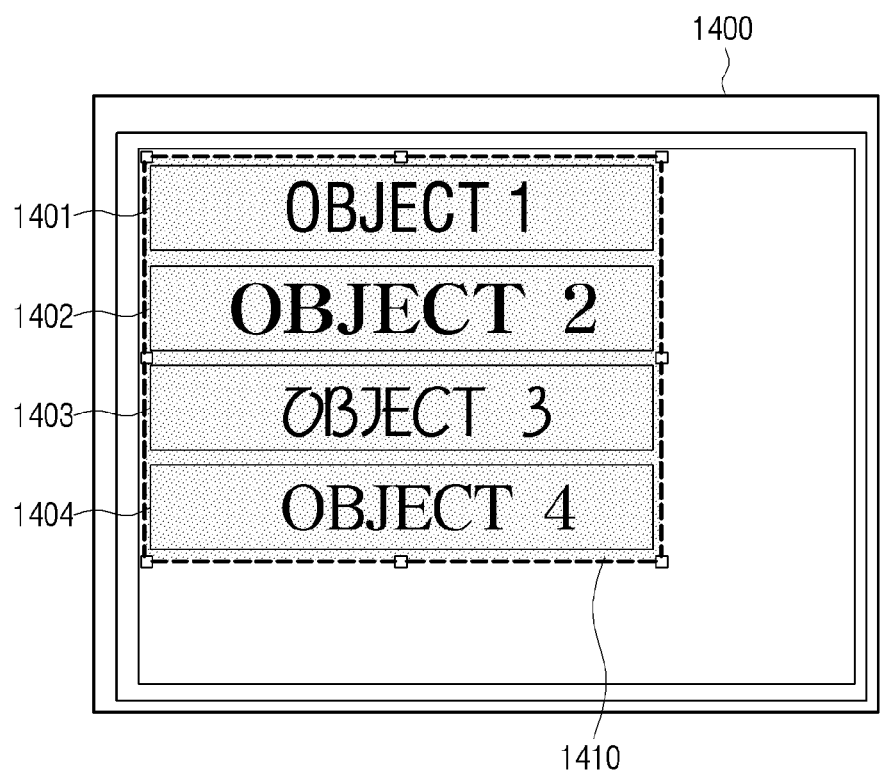
FIG. 14 illustrates an example of a method of selecting all of the objects on a preview screen according to an exemplary embodiment of the present general inventive concept.

FIG. 14 illustrates an example of a method of selecting all of the objects on a preview screen 1400 according to an exemplary embodiment of the present general inventive concept.

With reference to FIG. 4, the user generates a selection area 1410 including all of a plurality of objects 1401, 1402, 1403, and 1404 displayed on the preview screen 1400. The selection area 1410 includes the four objects. The four objects are text and each have a different font type and font size.

Since the user generates the selection area including all the four objects, the four objects are extracted and printing options thereof may be changed at the same time.

Figure 15:
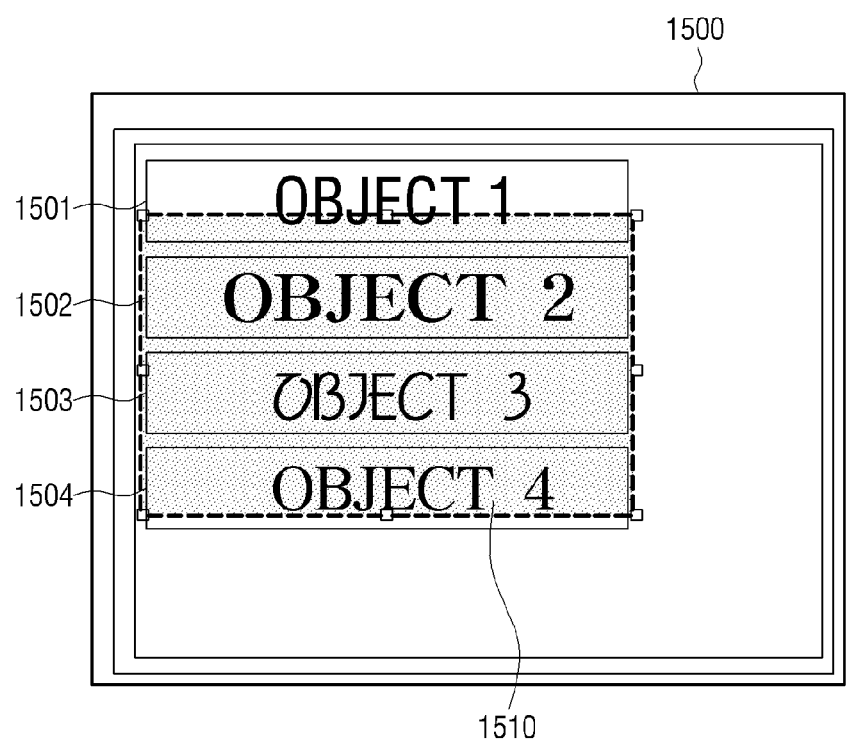
FIG. 15 illustrates an example of a method of selecting some of the objects on a preview screen according to an exemplary embodiment of the present general inventive concept.

FIG. 15 illustrates an example of a method of selecting some of the objects on a preview screen 1500 according to an exemplary embodiment of the present general inventive concept.

With reference to FIG. 15, the user generates a selection area 1510 including all of second and third objects 1502 and 1503 and portions of first and fourth objects from among a plurality of objects 1501, 1502, 1503, and 1504 displayed on a preview screen 1500. The selection area 1510 includes the four objects.

In FIG. 15, the selection area 1510 is expressed in a box of a dotted line, but this is merely an example. The selection area 1510 may be expressed in a box of a solid line or may not be expressed a box, but as a different shape such as an oval or a triangle, for example.

The selection area 1510 selected by the user includes two entirely-selected objects and two partially-selected objects. Referring to FIG. 15, approximately 30% of the first object 1501 is included in the selection area 1510, and approximately 70% of the fourth object 1504 is included in the selection area 1510.

Since the user generates the selection area 1510 including two entirely-selected objects and two partially-selected objects, the two partially-selected objects included in the selection area 1510 may be set to be included in the selection area or excluded from the selection area according to an object setting condition, as previously stated. If the two partially-selected objects included in the selection area 1510 are set to be included in the selection area, it is possible to change printing options corresponding to the two partially-selected objects.

Figure 16:
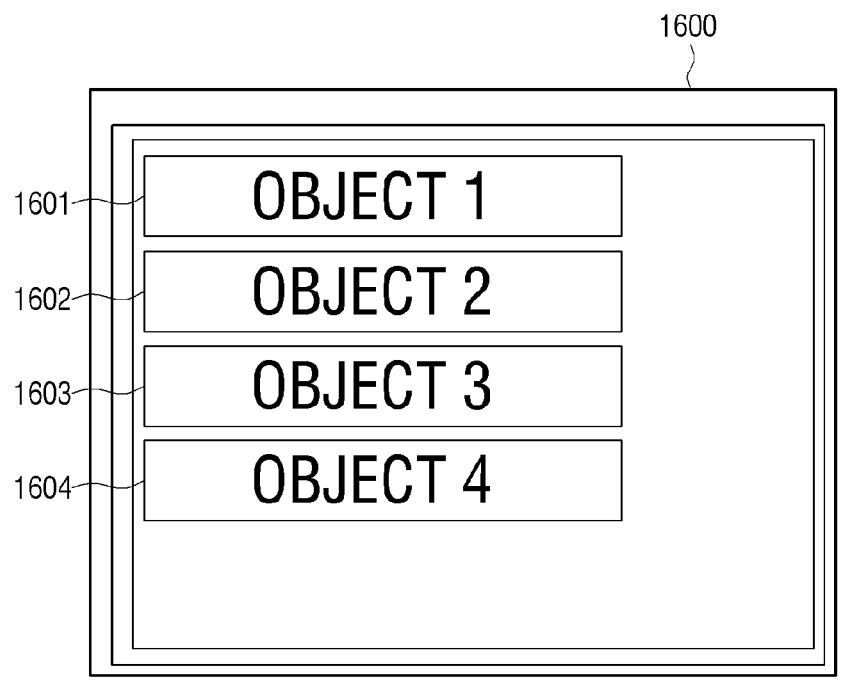
FIG. 16 illustrates an example of the result of changing printing options for all of the objects on a preview screen according to an exemplary embodiment of the present general inventive concept.

FIG. 16 illustrates an example of the result of changing printing options corresponding to all of the objects on a preview screen 1600 according to an exemplary embodiment of the present general inventive concept.

With reference to FIG. 16, the four objects 1601, 1602, 1603, and 1604 are converted into text having a same font type and font size and are displayed. That is, if the user selects four objects as illustrated in FIG. 14 and changes printing options corresponding to the four objects, the four objects are converted to have the same printing options.

Assuming that the user inputs a selection area 1510 including two entirely-selected objects and two partially-selected objects from among the four objects as illustrated in FIG. 15, if the object selecting condition 1110 illustrated in FIG. 11 is set to "select an object when a portion of the object is included", printing options corresponding to all four objects are changed and a result is output as illustrated on the preview screen 1600 of FIG. 16.

If the object selecting condition 1120 illustrated in FIG. 11 is set to "exclude an object when a portion of the object is included", printing options only corresponding to the second and third objects from among the four objects are changed.

Figure 17:
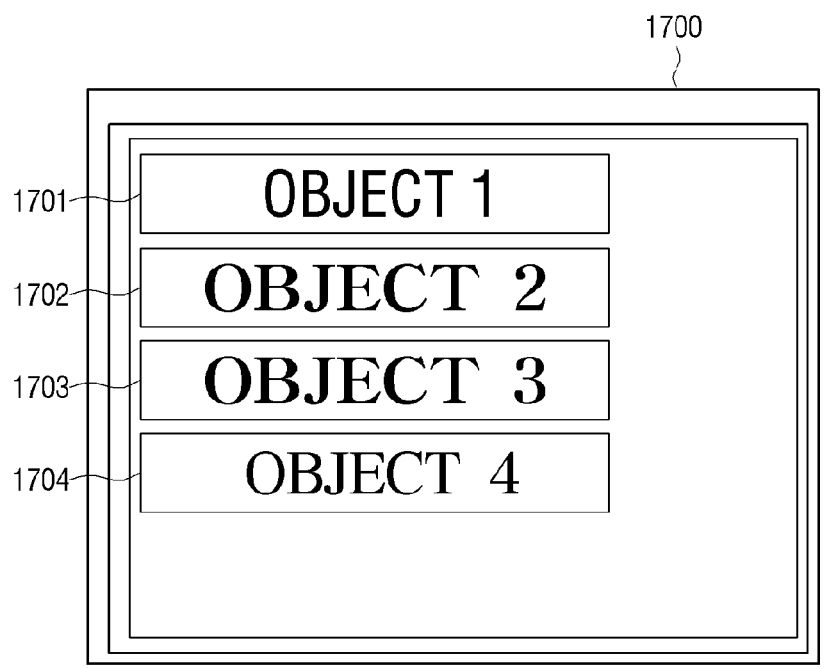
FIG. 17 illustrates an example of the result of changing printing options for some of the objects on a preview screen according to an exemplary embodiment of the present general inventive concept.

Accordingly, as illustrated in FIG. 17, printing options only corresponding to second and third objects 1702 and 1703 are changed and displayed on the preview screen 1700. Printing options corresponding to first and fourth objects 1701 and 1704 are not changed.

If the object selecting condition 1130 illustrated in FIG. 11 is set to "select an object when more than 60% of the object is included," since 30% of the first object 1501 illustrated in FIG. 15 is included in the selection area 1510 and 70% of the fourth object 1504 is included in the selection area, it is determined that the first object 1501 is not included in the selection area 1510 and the fourth object 1504 is included in the selection area 1510 so that printing options corresponding to the second, third, and fourth objects 1502, 1503, and 1504 are converted into second, third, and fourth objects 1802, 1803, and 1804, and are displayed on a preview screen 1800.

Figure 18:
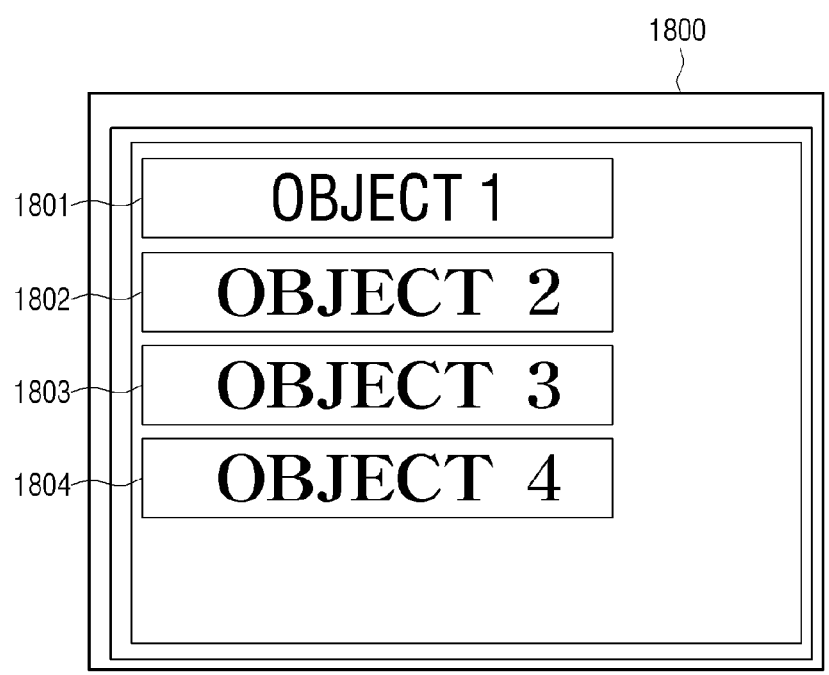
FIG. 18 illustrates another example of the result of changing printing options for some of the objects on a preview screen according to an exemplary embodiment of the present general inventive concept.

However, printing options corresponding to the first object 1501 of FIG. 15 are not changed and are displayed as the first object 1801, as illustrated in FIG. 18.

Figure 19:
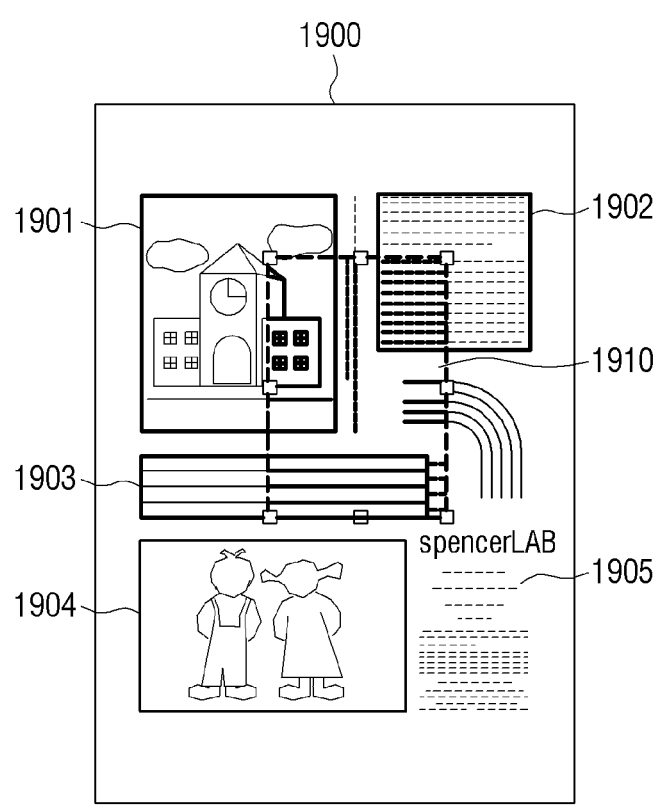
FIG. 19 illustrates a window screen to select some of the objects on a preview screen according to an exemplary embodiment of the present general inventive concept.

FIG. 19 illustrates a window screen to select some of the objects on a preview screen 1900 according to an exemplary embodiment of the present general inventive concept.

With reference to FIG. 19, the preview screen 1900 includes a first object 1901, a second object 1902, a third object 1903, fourth object 1904, and a fifth object 1905.

If the user generates a selection area 1910 including portions of the first, second and third objects 1901, 1902, and 1903, the first, second and third objects 1901, 1902, and 1903 may be included in or excluded from the selection area 1910, according to an object selecting condition.

A process of selecting a specific area by the user is described with reference to FIG. 20.

Figure 20:
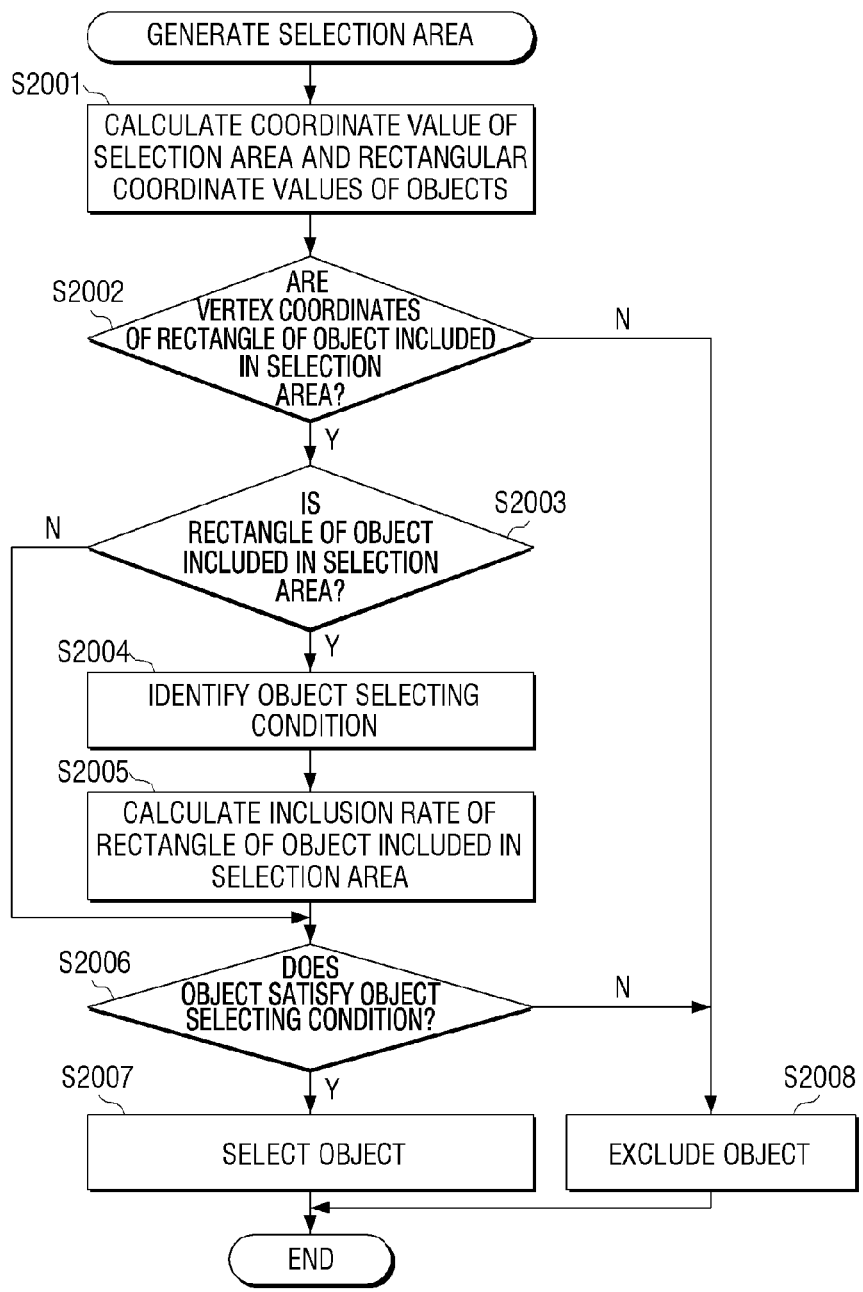
FIG. 20 is a flow chart illustrating a process of extracting a selected object on a preview screen according to an exemplary embodiment of the present general inventive concept.

FIG. 20 is a flow chart illustrating a process of extracting a selected object on the preview screen 1900 of FIG. 9, according to an exemplary embodiment of the present general inventive concept.

With reference to FIG. 20, the user generates the selection area 1910 on the preview screen 1900 as illustrated in FIG. 19. In operation S2001, a coordinate value of the selection area 1910 is calculated, and rectangular coordinate values of entirely-selected or partially-selected objects included in the selection area 1910 are calculated.

In operation S2002, it is determined whether vertex coordinates of a rectangle of an object are included in the selection area 1910 by comparing the vertex coordinates of the rectangle of the object with the coordinate value of the selection area 1910.

If the vertex coordinates of the rectangle of the object are included in the selection area 1910 in operation S2002-Y, it is determined whether the rectangle of the object is included in the selection area 1910 in operation S2003. If the vertex coordinates of the rectangle of the object are positioned outside the selection area 1910 in operation S2002-N, the corresponding object is excluded from a subject to extract in operation S2008.

If the rectangle of the object is included in the selection area 1910 in operation S2003-Y, an object selecting condition 1110, 1120, or 1130, as illustrated in FIG. 11, for example, is identified in operation S2004. The object selecting condition 1110, 1120, or 1130 may be set to at least one of "selecting an object when a portion of the object is included", "excluding an object when a portion of the object is included", and "selecting an object when more than a specific rate of the object is included," respectively, as illustrated in FIG. 11, for example.

In operation S2005, after identifying the object selecting condition 1110, 1120, or 1130, the inclusion rates of the rectangles of the plurality of objects 1901, 1902, and 1903 included in the selection area 1910 are calculated.

As described above, the object selecting condition 1110, 1120, or 1130 may be set to at least one of "selecting an object when a portion of the object is included", "excluding an object when a portion of the object is included", and "selecting an object when more than a specific rate of the object is included," respectively, as illustrated in FIG. 11. Accordingly, in operation S2006, it is determined whether the plurality of objects 1901, 1902, and 1903 satisfy the preset object selecting condition 1110, 1120, or 1130.

Whether to include an object of which a portion is included in the selection area 1910 may depend on which object selecting condition 1110, 1120, or 1130 is preset. That is, if an item of "selecting an object when a portion of the object is included" is set, an object of which a portion is included in the selection area 1910 is processed to be included in the selection area regardless of the inclusion rate. In this case, the plurality of objects 1901, 1902, and 1903 are processed to be included in the selection area 1910.

If an item of "excluding an object when a portion of the object is included" is set, an object of which a portion is included in the selection area 1910 is processed to be excluded from the selection area regardless of the inclusion rate. In this case, the plurality of objects 1901, 1902, and 1903 are processed to be excluded from the selection area 1910.

If an item of "selecting an object when more than a specific rate of the object is included" is set, an object of which a portion is included in the selection area 1910 is processed to be included in the selection area only when an inclusion rate is more than the specific rate. In this case, the first and second objects 1901 and 1902 are processed to be excluded from the selection area 1910 since more than the specific rate, e.g. 60% of the first and second objects 1901 and 1902 are not included in the selection area 1910. In addition, the third object 1903 is processed to be included in the selection area 1910 since more than the specific rate, e.g. 60% of the third object 1903 is included in the selection area 1910.

As described above, whether to select the plurality of objects 1901, 1902, and 1903 of which portions are included in the selection area 1910 may depend on the object selecting condition 1110, 1120, or 1130. In operation S2007, an object which satisfies the object selecting condition 1110, 1120, or 1130 is selected as an object to change printing options.

In operation S2008, when a printing option regarding the selected object is changed, only the printing option regarding the selected object may be changed, but different objects may not be changed.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control apparatus, comprising:
    a display to display a preview screen of a document to print;
    at least one microprocessor, which provides:
        a control unit to
            extract objects included in the document displayed on the preview screen,
            sense a user manipulation for inputting a selection area on the preview screen,
            determine whether the extracted object includes a partially overlaid portion with the selection area,
            perform a determination that the partially overlaid object is a selected object when a rate of the partially overlaid portion is higher than a predetermined rate,
            receive a user input for selecting object types which are different from each other, and
            set an identical printing option for objects which belong to the selected object types from among all selected objects including the selected partially overlaid extracted objects according to the determination; and
        a printing data generation unit to generate printing data in which a printing option corresponding to an object among the objects is set and to spool the printing data,
    wherein the control unit controls the display unit to display a user interface (UI) screen to set the predetermined rate,
    wherein the control unit, in response to receiving a user input for selecting an activation button included on the preview screen, activates an object selection mode for sensing the user manipulation for inputting the selection area on the preview screen.

2. The printing control apparatus as claimed in claim 1, wherein the control unit controls the display to display a user interface (UI) screen to select the object types.

3. A printing control method of a printing control apparatus, the method comprising:
    displaying a preview screen of a document to print;
    in response to receiving a user input for selecting an activation button included on the preview screen, activating an object selection mode for sensing a user manipulation for inputting a selection area on the preview screen;
    sensing the user manipulation for inputting the selection area on the preview screen;
    extracting objects included in the document displayed on the preview screen;
    determining whether the extracted objects include partially overlaid portions with the selection area;
    displaying a user interface (UI) screen to set a predetermined rate;
    determining that the partially overlaid object is a selected object when a rate of the partially overlaid portion is higher than the set predetermined rate;
    receiving a user input for selecting object types which are different from each other;
    setting an identical printing option for objects which belong to the selected object types from among the selected partially overlaid extracted objects; and
    generating printing data in which the printing option is set and spooling the printing data.

4. The printing control method as claimed in claim 3, further comprising:
    displaying a user interface (UI) screen to select the object types.

5. A non-transitory computer-readable recording medium having embodied thereon a computer program to execute a printing control method of a printing control apparatus, the printing control method comprising:
    displaying a preview screen of a document to print;
    in response to receiving a user input for selecting an activation button included on the preview screen, activating an object selection mode for sensing a user manipulation for inputting a selection area on the preview screen;
    sensing the user manipulation for inputting the selection area on the preview screen;
    extracting objects included in the document displayed on the preview screen;
    determining whether the extracted objects include partially overlaid portions with the selection area;
    display a user interface (UI) screen to set a predetermined rate;
    determining that the partially overlaid object is the selected object when a rate of the partially overlaid portion is higher than the set predetermined rate;
    receiving a user input for selecting object types which are different from each other;
    setting an identical printing option for objects which belong to the selected object types from among the selected partially overlaid extracted objects; and
    generating printing data in which the printing option is set and spooling the printing data.

* * * * *